United States Patent
Dollar et al.

(10) Patent No.: US 9,734,404 B2
(45) Date of Patent: *Aug. 15, 2017

(54) MOTION STABILIZATION AND DETECTION OF ARTICULATED OBJECTS

(71) Applicant: Microsoft Technology Licensing, LLC, Redmond, WA (US)

(72) Inventors: Piotr Dollar, Redmond, WA (US); Charles Lawrence Zitnick, III, Seattle, WA (US); Dennis I. Park, Irvine, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/622,364

(22) Filed: Feb. 13, 2015

(65) Prior Publication Data

US 2015/0154454 A1    Jun. 4, 2015

Related U.S. Application Data

(63) Continuation of application No. 13/895,964, filed on May 16, 2013, now Pat. No. 8,977,060.

(51) Int. Cl.
*G06K 9/00* (2006.01)
*G06T 7/246* (2017.01)

(52) U.S. Cl.
CPC .......... *G06K 9/00711* (2013.01); *G06T 7/246* (2017.01)

(58) Field of Classification Search
CPC .............. G06K 9/00711; G06K 9/3241; G06T 7/2033; G06T 2207/10016; G06T 7/20

USPC ....... 382/107, 103, 100, 224, 305, 104, 154, 382/276, 236, 153, 293

See application file for complete search history.

(56) References Cited

U.S. PATENT DOCUMENTS

| | | | |
|---|---|---|---|
| 5,777,690 A | 7/1998 | Takeda et al. | |
| 7,302,004 B2 | 11/2007 | Zhang et al. | |
| 7,447,334 B1 * | 11/2008 | Jiang | G06K 9/00362 348/143 |
| 7,598,514 B2 | 10/2009 | Freedman et al. | |
| 7,646,887 B2 * | 1/2010 | Goncalves | G06K 9/3233 235/383 |

(Continued)

OTHER PUBLICATIONS

Barkeshli et al., "Structure of Quasiparticles and Their Fusion Algebra in Fractional Quantum Hall States," In Journal of Physical Review B, vol. 79, Issue 19, Published Date: May 29, 2009, 16 pages.

(Continued)

*Primary Examiner* — Sheela C Chawan
(74) *Attorney, Agent, or Firm* — Jacob P. Rohwer; Newport IP, LLC (57) ABSTRACT

The techniques and systems described herein are directed to isolating part-centric motion in a visual scene and stabilizing (e.g., removing) motion in the visual scene that is associated with camera-centric motion and/or object-centric motion. By removing the motion that is associated with the camera-centric motion and/or the object-centric motion, the techniques are able to focus motion feature extraction mechanisms (e.g., temporal differencing) on the isolated part-centric motion. The extracted motion features may then be used to recognize and/or detect the particular type of object and/or estimate a pose or position of a particular type of object.

20 Claims, 4 Drawing Sheets

(56) References Cited

U.S. PATENT DOCUMENTS

| | | |
|---|---|---|
| 8,075,499 B2 | 12/2011 | Nathan et al. |
| 8,144,118 B2 * | 3/2012 | Hildreth ................. A63F 13/00 |
| | | 345/156 |
| 8,160,149 B2 | 4/2012 | Demos |
| 8,209,279 B2 | 6/2012 | Freedman et al. |
| 8,275,428 B2 | 9/2012 | Bonderson et al. |
| 8,654,250 B2 | 2/2014 | Chen et al. |
| 8,977,060 B2 * | 3/2015 | Dollar .................. G06T 7/2033 |
| | | 348/E5.065 |
| 2006/0018516 A1 * | 1/2006 | Masoud ............. G06K 9/00342 |
| | | 382/115 |
| 2012/0112168 A1 | 5/2012 | Bonderson et al. |
| 2014/0341474 A1 | 11/2014 | Dollar et al. |

OTHER PUBLICATIONS

Bonderson et al., "Implementing Arbitrary Phase Gates with Ising Anyons," In Physical Review Letters, vol. 104, Issue 18, Published Date: May 7, 2010, 5 pages.

Bonesteel et al., "Braid Topologies for Quantum Computation," In Journal of Physical Review Letters, vol. 95, Issue 14, Published Date: Sep. 29, 2005, 4 pages.

Brennen et al., "Why Should Anyone Care about Computing with Anyons?", In Proceeding of the Royal Society A, Published Date: Oct. 16, 2007, 25 pages.

Jiannis K. Pachos, "Introduction to Topological Quantum Computation," Publisher: Cambridge University Press, 1 edition, Published Date: May 25, 2012, 41 pages.

* cited by examiner

MOTION STABILIZATION AND DETECTION OF ARTICULATED OBJECTS

PRIORITY APPLICATION

This application is a continuation of, and claims priority to, U.S. patent application Ser. No. 13/895,964, filed May 16, 2013, entitled "Motion Stabilization and Detection of Articulated Objects," the entirety of which is herein incorporated by reference.

BACKGROUND

Computing systems may model motion in a visual scene (e.g., a sequence of video frames or temporal images) to detect object movement. For example, computing systems may calculate an optical flow as the movement of a pixel from one video frame to the next video frame. The calculated optical flow for each pixel in the video frames may include a vector for x-direction movement and a vector for y-direction movement. Moreover, by considering the optical flow of multiple pixels, the computing systems may model or estimate a pattern of motion for objects, surfaces, and/or edges in the visual scene.

Motion, or the movement of pixels, within the visual scene may come from several sources. First, motion within a visual scene may be attributed to movement of a camera with respect to a stationary world coordinate, and thus, may be classified as "camera-centric" motion. Second, motion within a visual scene may be attributed to general movement of an object (e.g., a person that is walking) with respect to a stationary world coordinate, and thus, may be classified as "object-centric" motion. Finally, motion within a visual scene may be attributed to more detailed movement of one or more parts (e.g., arm and leg movement) of a larger object (e.g., the person walking), and thus, may be classified as "part-centric" motion.

When modeling motion based on optical flow, the camera-centric motion and/or the object-centric motion may introduce noise that may make it difficult for systems to detect a particular type of object. In other words, the camera-centric motion and/or the object-centric motion are often associated with more general movement that may not be useful to characterize the particular type of object and that may not aid a system in distinguishing the particular type of object from other objects or a background setting. Thus, the noisy movement introduced by the camera-centric motion and/or the object-centric motion may be detrimental to object detection systems.

SUMMARY

The techniques and systems described herein are directed to isolating part-centric motion (e.g., may be referred to as "useful" or "relevant" motion herein) in a visual scene and stabilizing (e.g., removing) motion in the visual scene that is associated with camera-centric motion and/or object-centric motion (e.g., may be referred to as "non-useful" or "irrelevant" motion herein). By removing the non-useful motion, the techniques are able to focus motion feature extraction mechanisms (e.g., temporal differencing) on the isolated part-centric motion. The extracted motion features may then be used to recognize and/or detect a particular type of object and/or estimate a pose or position of a particular type of object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The techniques and systems described herein are directed to isolating part-centric motion in a visual scene. The part-centric motion serves as a relevant and useful cue when recognizing and/or detecting a particular type of object. That is, the part-centric motion often includes non-rigid motion that characterizes a particular object or that may distinguish a particular type of object from other moving objects in the visual scene or from background movement. Accordingly, the techniques discussed herein stabilize (e.g., remove) the irrelevant or non-useful motion in the visual scene. Stabilizing the irrelevant or non-useful motion in the visual scene may involve removing at least some movement in the visual scene that may result from the camera-centric motion and/or the object-centric motion.

By removing the irrelevant or non-useful motion or the movement that results from the camera-centric motion and/or the object-centric motion, the techniques are able to isolate the part-centric motion and focus motion feature extraction mechanisms (e.g., temporal differencing) on the isolated part-centric motion. The extracted motion features may then be used to recognize and/or detect the particular type of object and/or estimate a pose or position of a particular type of object.

As used herein, a visual scene may include multiple images that are part of a sequence of images or temporal series of images. Thus, a visual scene may include video with multiple frames, still images that capture a visual environment over a period of time (e.g., periodic capture or non-periodic capture), or other sequences of images where an object or a pixel may move from one image to the next image (e.g., motion).

In various embodiments, the objects in the visual scene for which the system isolates the part-centric motion for recognition and detection purposes are articulated objects. Articulated objects are objects that have one or more parts or limbs that move (e.g., pivot) independently of the larger object. For example, a person walking may include multiple types of motion. First, the person may be walking from left to right in a visual scene (e.g., object-centric motion). Secondly, while walking, the person's legs are moving step by step (e.g., part-centric motion of the legs). Finally, while walking, the person's arms may be swinging at the side of the body (e.g., part-centric motion of the arms). While this document uses humans as an example of an articulated object, it is understood in the context of this document that the techniques may apply to any articulated object. Other examples of articulated objects may include, but are not limited to, animals (e.g., dogs, cats, horses, etc.), robots, bicycles, or any other objects that have parts or limbs that may move or pivot in a manner that characterizes the particular type of object.

As discussed above, the camera-centric motion and/or the object-centric motion may introduce noisy movement that may not be useful or relevant to systems that are configured to recognize or detect a particular type of object based on motion over time. That is, the camera-centric motion and/or the object-centric motion are often associated with general movement that is smooth, less frequent and/or non-periodic compared to part-centric motion that may be non-rigid, faster, more frequent and/or periodic (e.g., leg steps and arm swings are periodic and occur more frequently than general movement of the person moving through a visual scene from left to right). Thus, by removing the irrelevant or non-useful movement associated with the camera-centric motion and/or the object-centric motion (e.g., stabilizing the motion), the techniques can isolate the part-centric motion and focus motion feature extraction on the part-centric motion. This improves the detection accuracy and/or the time it takes to detect or recognize a particular type of object.

Accordingly, the techniques discussed herein may be implemented in systems directed to recognizing and/or detecting articulated objects in a visual scene, or estimating a pose of an articulated object. Such systems may include vision systems, automobile systems (e.g., automated driving systems), security systems, video production systems, human computer interaction (HCI) systems, image processing systems, and so forth.

The term "techniques" used herein, for instance, may refer to system(s), method(s), computer-readable instructions, algorithms, components, modules, and/or models as permitted by the context above and throughout this document.

EXAMPLE OVERVIEW

Figure 1:
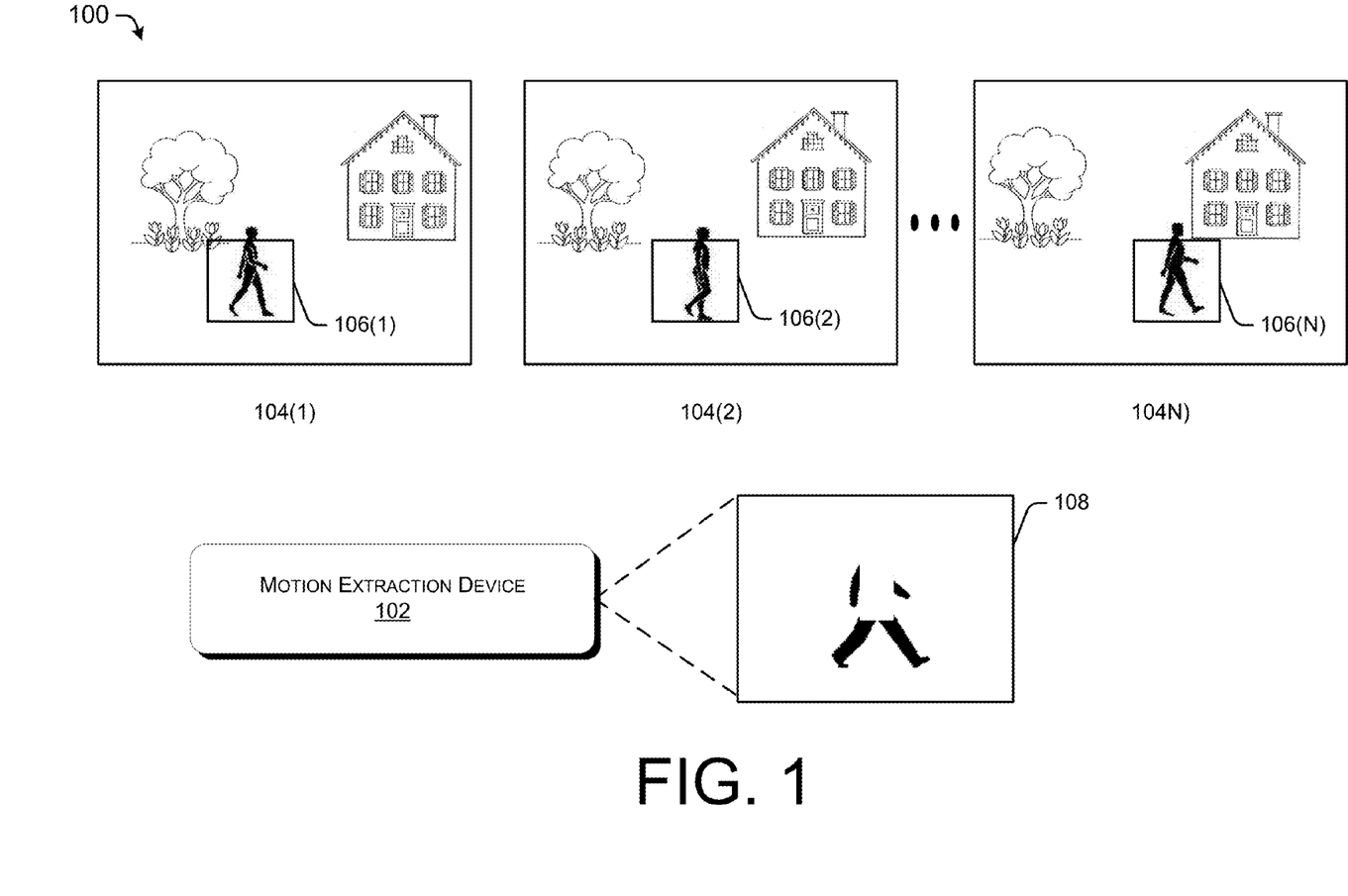
FIG. 1 shows an example overview that stabilizes irrelevant motion in a sequence of image and isolates relevant motion that is useful for articulated object detection, in accordance with various embodiments described herein.

FIG. 1 show an example overview 100 of an environment in which the techniques stabilize the irrelevant or non-useful motion and isolate the part-centric motion in a visual scene. As mentioned above, the camera-centric motion and the object-centric motion may introduce noise, or general movement, that may make it difficult for a system to recognize or detect a particular type of an articulated object (e.g., a human). In other words, the more motion that exists within a visual scene makes it more difficult to correctly detect useful motion that characterizes a particular type of articulated object.

Therefore, FIG. 1 illustrates a motion extraction device 102 that may receive and stabilize a sequence of images 104(1) . . . 104(N) (e.g., video frames) that represent a visual scene. The visual scene conveys object movement from one image to the next (e.g., a person, a house, and a tree). The number of images N in the sequence may be any number (e.g., two, three, five, ten, twenty, forty and so forth) of images from which temporal differences between images allows for object or pixel movement that can be recognized or detected. Thus, a number of images N sampled and used by the motion extraction device 102 to isolate part-centric motion and to detect an articulated object may depend on a time or sampling frequency between two images captured or a total time between the first image in the sequence and the last image in the sequence. Ultimately, the motion detection device 102 may capture a sequence of images 104(1) . . . 104(N) that includes enough motion for object recognition and/or detection purposes.

As seen in the sequence of images 104(1) . . . 104(N), a person is walking from left to write. Thus, the sequence of images 104(1) . . . 104(N) includes visual aspects associated with object-centric motion. For example, the person, as a complete larger object, is not in the same location in each of the images (e.g., the person is closer to the house in image 104(N) compared to image 104(1)).

Additionally, the sequence of images 104(1) . . . 104(N) includes visual aspects associated with camera-centric motion. For example, the house and the tree may be stationary objects (e.g., no general object-centric motion), and thus, the movement of the house and the tree within the visual scene is introduced by movement of the camera or other image device capturing the visual scene (e.g., a change in location or position of the camera such as one that may be mounted on or attached to an automobile). That is, it can be seen that the house and the camera are closer to the left side in image 104(N) compared to their positions in image 104(1) (e.g., further to the right side). There may also be camera-centric motion aspects associated with the movement of the person.

Accordingly, the movement of the house and the tree, and the directional "walking" movement of the person are general movements that may not be useful or relevant when attempting to detect a person. Moreover, this movement may complicate detection. For example, a bike or a dog moving in lieu of the person in the same visual scene may provide the same or similar general positional movements. In this scenario, a system may determine that an object is moving through the visual scene but may not accurately determine what type of object is moving (e.g., a human).

However, the part-centric motion associated with movement of the arms and legs of the person, is motion that characterizes usual movement of a person, and thus, the motion extraction device 102 is configured to isolate this motion which significantly increases the accuracy of detection and/or the speed of detection. Within a visual scene, the part-centric motion is often associated with a smaller space compared to general movement that results from camera-centric motion and/or object-centric motion (e.g., larger background motion, smoother motion, and low frequency motion). Therefore, the motion extraction device 102 does not have to spend processing time and processing resources to estimate movement (e.g., optical flow) for each of the pixels in the sequence of images 104(1) . . . 104(N). Rather, the motion extraction device 102 can focus motion features extraction mechanisms on a region where the part-centric motion occurs.

Accordingly, each image in the sequence 104(1) . . . 104(N) includes a respective window 106(1) . . . 106(N) around the part-centric motion (e.g., a detection window). The motion extraction device 102 uses the windows 106(1) . . . 106(N) to identify regions with non-rigid and/or frequent movement over the sequence of frames. The motion extraction device 102 may summate, in the windows 106(1) . . . 106(N), the pixel flow associated with the parts (e.g., arms and legs) of the articulated object. In the example environment of FIG. 1, a single window captures both the arms and legs of the person. However, in an alternative implementation the motion extraction device 102 may use separate windows to focus on and capture different movement that characterizes a particular type of object (e.g., a first window with a size configured to cover leg movement and a second window with a size to cover arm movement).

Thus, the size of the window 106(1) . . . 106(N) and/or the number of windows may vary based on an expected detection size of an articulated object. The expected detection size of an articulated object may depend on a detection proximity of the articulated object to a system implementing extraction device, a zoom setting of a camera capturing the articulated object, and so forth. For example, an automated driving system on an automobile that employs the motion extraction device 102 may configure the size of one or more windows to cover half the body of a person that may be within a predefined distance to the automobile (e.g., three feet, five feet, seven feet, etc.). This may be set in accordance with a specific use to detect when pedestrians are close to the automobile so the driver can be warned and a collision can be avoided. Thus, the window size may be calibrated for a system and a particular type of articulated object to be detected.

Once the motion extraction device 102 receives the sequence of images 104(1) . . . 104(N), the motion extraction device 102 isolates the part-centric motion by computing coarse-scale optical flow that aligns the general movement in the sequence of images 104(1) . . . 104(N) that results from object-centric motion and camera-centric motion. The aligned general movement can then be removed from consideration when extracting motion features. Thus, as shown in a sequence alignment 108, motion associated with the arms and legs is isolated. The motion extraction device 102 is able to focus on extracting motion features associated with the part-centric motion that remains after the stabilization removes the general motion (e.g., smoother, low frequency movement) of the house, the tree, and the directional movement of the human body as a whole, which usually does not significantly change from one image to the next. Yet, the motion extraction device 102 is able to isolate the movement of the arms and legs (e.g., the smaller, high frequency movement) that characterizes a type of articulated object, such as a human. The part-centric motion that remains in sequence alignment 108 may represent the positions of the arms and legs in each of the images 104(1) . . . 104(N) and the movement of the arms and legs as they change positions from one image to the next image.

Illustrative Device

Figure 2:
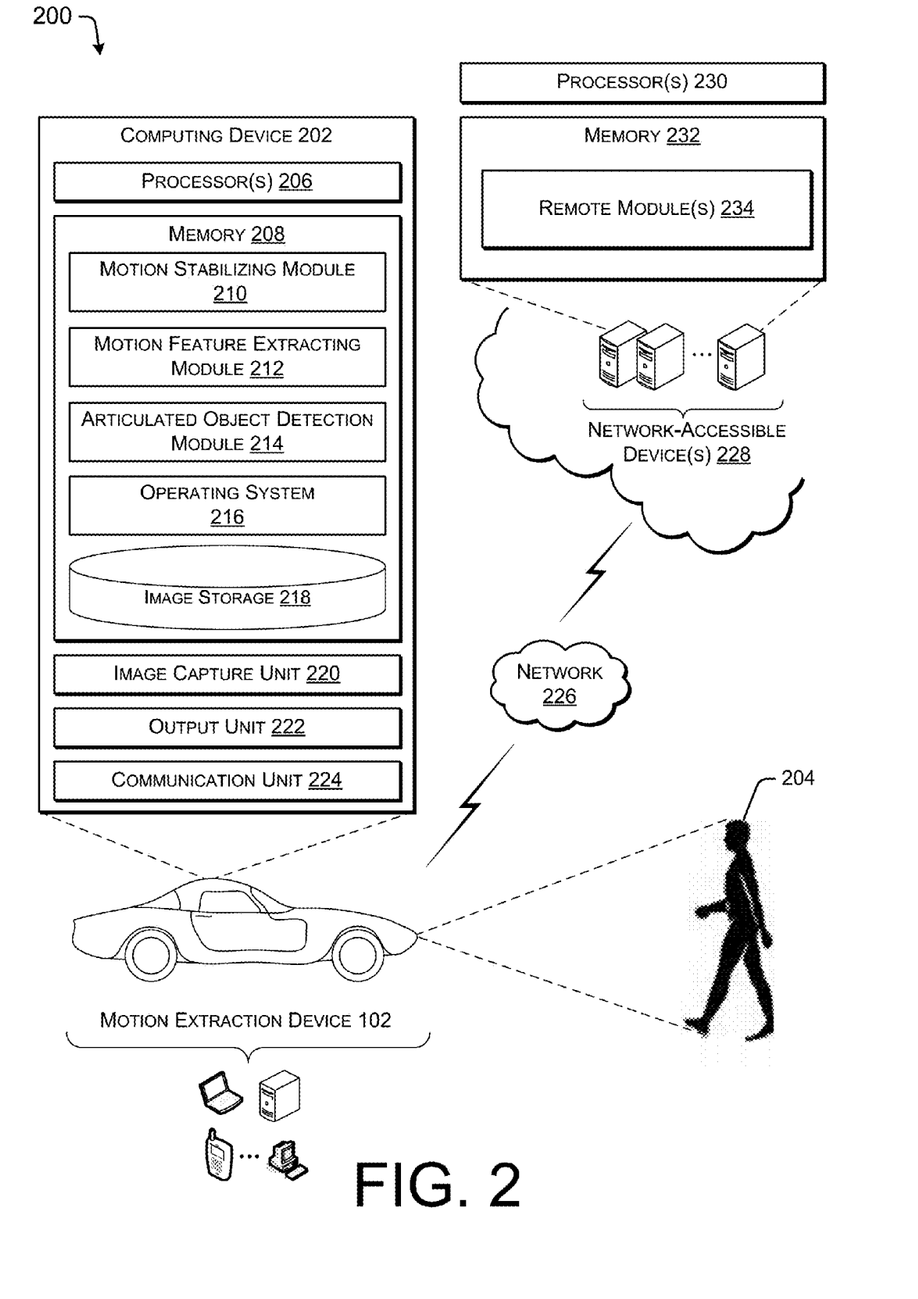
FIG. 2 shows a functional diagram of selected components implemented at a computing device, in accordance with various embodiments described herein.

FIG. 2 illustrates example functional modules and/or components of the motion extraction device 102 illustrated in FIG. 1. The motion extraction device 102 may comprise one or more computing devices 202 that support receiving or capturing a sequence of images 104(1) . . . 104(N) from which part-centric motion of an articulated object may be isolated. Once isolated, motion features may be extracted, and the articulated object recognition and detection may be implemented. Thus, the motion extraction device 102 may comprise a single computing device 202 or multiple computing devices 202 that may communicate and/or work together to provide such functionality.

The computing device 202 may comprise one of an array of computing devices capable of receiving images, removing the irrelevant or non-useful motion associated with object-centric motion and/or camera-centric motion, isolating the useful or relevant motion associated with part-centric motion, extracting motion features from the isolated part-centric motion that remains, and detecting an articulated object. Examples may include a server computer, a client computer, a personal computer, a laptop computer, a mobile phone, a personal digital assistant (PDA), tablets, gaming consoles, set top boxes, and the like. In some embodiments, the computing device 202 may be part of a larger system that may provide a service based on detecting an articulated object 204.

For example, the computing device 202 may be part of an automobile system configured to determine if an articulated object 204 (e.g., a pedestrian) is within a predetermined proximity to the automobile (e.g., the automobile is about to hit the pedestrian in a crosswalk), and if so, to implement remedial actions (e.g., warn the driver, automatically stop the car, automatically change directions, and so forth). The computing device 202 may be part of a robotics system configured to implement human computer interaction (HCI) functionality. The computing device 202 may be part of a video or still image production system that recognizes and detects humans or other articulated objects in a visual scene so that they can be removed or green spaced in accordance with personal privacy or copyright laws. Or, the computing device 202 may be part of a security system configured to detect when an intruder or other unwanted articulated object (e.g., raccoons, coyotes, etc.) are close to a dwelling and may pose a danger to a family or pets. The examples provided above are not an exhaustive list of systems that may employ the functionality of the motion detection device 102. Rather, any system directed to detecting or recognizing a particular type of articulated object in a visual scene may employ the functionality of the motion detection device 102 as discussed herein.

To this end, the computing device 202 may comprise one or more processors 206 and memory 208. The memory 208 may include a motion stabilizing module 210 to isolate useful motion from a visual scene (e.g., the part-centric motion) and/or to remove the noisy motion that may be irrelevant and non-useful (e.g., the camera-centric motion and/or the object-centric motion), a motion feature extraction module 212 to compute and extract motion features over the sequence of images, an articulated object detection module 214 to use one or more algorithms to classify the extracted motion, and an operating system 216 configured to manage hardware and services within and coupled to the computing device 202 for the benefit of other modules. The memory 208 may also include an image storage element 218. Moreover, the computing device 202 may comprise an image capture unit 220, an output unit 222, and/or a communication unit 224.

The processor(s) 206 may be a single processing unit or a number of units, all of which could include multiple computing units. The processor(s) 206 may be implemented as one or more graphical processing units (GPUs), microprocessors, microcomputers, microcontrollers, digital signal processors, central processing units, state machines, logic circuitries, system on chip (SoC), and/or any other devices that manipulate signals based on operational instructions. Among other capabilities, the processors 206 may be configured to fetch and execute computer-readable instructions stored in the memory 208.

The memory 208 may comprise computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer-readable instructions, data structures, program modules, or other data in a modulated data signal, such as a carrier wave. As defined herein, computer storage media does not include communication media.

The image capture unit 220 may comprise, for example, one or more of a camera, a charge-coupled device (CCD), a motion detection sensor, an infrared sensor, or another image capture device configured to capture a sequence of images in a visual scene and then store the images in the image storage element 218 for real-time or later processing, motion stabilization, and articulated object detection, as further discussed herein.

In various embodiments, the output unit 222 includes mechanisms to output notifications triggered by a positive detection of an articulated objects. For example, the mechanisms may include audible output (e.g., speakers) and/or visual output (e.g., display). The notifications may indicate that a particular articulated object has been detected. In at least one example, notification may be a warning that a pedestrian is within a certain proximity to a car, and thus, the driver should slow down or stop.

In various embodiments, the communication unit 224 is configured to facilitate a wired and/or wireless connection to a network, content providers, service providers and/or other devices. Therefore, the communication unit 224 may implement one or more of various wired and/or wireless technologies, such as satellite communications, Wi-Fi communications, mobile telephone network (MTN) communications, or any other acceptable communications or connections protocol.

FIG. 2 also illustrates an implementation where at least some of the functionality implemented by the motion feature extraction device 102 may be performed remotely, or via a network 226. For example, the computing device 202 may communicate, via the communication unit 224, with another entity, such as network-accessible devices 228. In one embodiment, the network-accessible devices 228 may provide cloud services.

The network-accessible devices 228 may be servers, and therefore, may also include one or more processors 230 and memory 232. The processor(s) 230 and the memory 232 of the network-accessible devices 228 are physically separate from the processor(s) 206 and memory 208 of the computing device(s) 202, but may function jointly as part of a system that provides processing and memory in part on the computing device(S) 202 and in part on the cloud services, for example. These network-accessible devices 228 may be arranged in any number of ways, such as server farms, stacks, and the like that are commonly used in data centers.

The modules and other components illustrated on the computing device 202 are collectively referred to as remote module(s) 234 on the network-accessible devices 228. Thus, the techniques described herein provide an implementation where some of the functionality may optionally be provided at the computing device 202 and at the network-accessible devices 228. For example, in one embodiment, the computing device 202 may capture the sequence of images and send them to the network-accessible devices 228 where the motion in the images may be stabilized, the motion features may be extracted, and an articulated object may be detected. Thus, the specific location of the respective modules used to implement the isolation and detection techniques discussed herein is not limiting and the description below is equally applicable to any implementation that includes local device(s), a cloud-based service, or combinations thereof.

As mentioned above, the motion stabilizing module 210 is configured to isolate useful motion from a visual scene (e.g., the part-centric motion) and/or to remove or stabilize the noisy motion (e.g., the camera-centric motion and/or the object-centric motion). In various embodiments, the motion stabilizing module 210 isolates the useful motion and/or removes the noisy motion by computing optical flow at a predetermined level of coarseness and then determining regions or spaces within the sequence of images where the computed optical flow indicates that there is non-rigid and high frequency motion.

Given a sequence of images, the motion stabilizing module 210 defines the t-th image in the sequence as $I'_t$. Moreover, the motion stabilizing module 210 defines an image patch in $I'_t$ as $I_t$ (e.g., the detection windows 106(1) ... 106(N) in FIG. 1). In various embodiments, the motion stabilizing module 210 may set the spatial extent, or the size, of $I_t$ to a predetermined window size based on an expected and/or usual size of the articulated object being detected (e.g., set the window size to capture a human, the leg motion of a human, or the arm motion of the human, etc.). For example, the motion stabilizing module 210 may set the spatial extent of $I_t$ to be a 32×64 pixel patch which may be associated with pedestrian or human detection within a predefined proximity (e.g., within three feet, five feet, ten feet, etc.) to a moving automobile that includes the motion extraction device 102 and an image capture unit 220 mounted to the front of the automobile or the rear-view mirror.

In various embodiments, the motion stabilizing module 210 computes optical flow at the predetermined level of coarseness by estimating the optical flow of the sequence of images using the Lucas-Kanade method or other optical flow algorithm that can compute optical flow for a group of neighboring pixels (e.g., coarse scale optical flow). The Lucas-Kanade method proposes a differential approach to optical flow estimation that is implemented hierarchically because the method assumes that the flow is constant in a local neighborhood of an individual pixel under consideration. In various embodiments, the Lucas-Kanade method solves the optical flow equations for the pixels in the neighborhood by using a least squares criterion. Accordingly, the motion stabilizing module 210 may set and/or adjust a scale, a, to compute optical flow at the predetermined level of coarseness. For example, the scale a is larger compared to computing or estimating optical flow for each individual pixel, and therefore, the scale a may range from 10 to 25 pixels (e.g., a group of pixels local to or within a neighborhood of an individual pixel under consideration). The Lucas-Kanade method of computing optical flow is fast and efficient since the motion stabilizing module 210 is directed to computing coarse scale optical flow computed for a group of pixels in association with the scale a and not fine scale optical flow computed for each pixel. Similar to the predetermined window size, in various embodiments, the motion stabilizing module 210 may select the scale a to be used based on an expected and/or usual size of the articulated object being detected.

After setting the scale a to achieve the predetermined level of coarseness for computing the optical flow, the motion stabilizing module 210 computes the flow field from image $I'_t$ to image $I'_{t-1}$ as $W_{t,t-1}$. The motion stabilizing module 210 defines $I'_{t-1,t}$ as image $I'_{t-1}$ warped to image $I'_t$ using the flow field $W_{t,t-1}$ computed based on the scale a. The motion stabilizing module 210 may then write an image patch to the warped image as $I_{t-1,t}$. The motion stabilizing module 210 writes, or applies, the image patch to the warped image to summate the computed flow within an individual patch, to identify a region or space with a threshold amount of motion (e.g., periodic, high frequency, and/or non-rigid motion associated with a part of an object), and to isolate the useful motion. That is, $W_{t,t-1}$ stabilizes or aligns the camera-centric motion and/or the object-centric motion (e.g., low frequency, general motion) that does not satisfy the threshold amount of motion within the image patch so that it can be removed from consideration. Thus, by writing or applying the image patch (e.g., detection window configured to a predetermined size) to the sequence of images, the motion stabilizing module 210 can identify the regions or spaces in the images that include motion that is most likely useful and relevant for accurate articulated object detection (e.g., periodic, high frequency, and/or non-rigid motion associated with part-centric motion).

In various embodiments, the motion stabilizing module 210 computes global motion $W_{t,t-n}$ across multiple images n by progressively warping and summing pair-wise flow fields.

Given images stabilized by the motion stabilizing module 210, the motion feature extracting module 212 is configured to focus on the regions or spaces identified by the image patches and to extract motion features from the isolated motion (e.g., the part-centric motion). As discussed, above the processing time improves at least because the motion feature extracting module 212 does not have to extract all the motion in the sequence of images because the noisy motion has been stabilized and removed. Rather, the motion feature extracting module 212 is able to focus on the useful cues associated with the part-centric motion that remains.

In various embodiments, the motion feature extracting module 212 uses temporal differencing (e.g., temporal gradient features) that computes differences on image patches that have been stabilized with course optical flow, and for which isolated motion associated with articulated object parts or limbs remains. The motion feature extracting module 212 defines the temporal gradient between two image patches (e.g., a pair of image patches) from different images or frames as follows:

$$D^\sigma = I_t - I_{t-1,t} \quad \text{Equ. (1)}$$

Here, σ is the scale of the computed flow discussed above. The temporal gradient $D^\sigma$ likely contains useful cues about object motion that may be helpful for detection purposes.

Equation (1) defines temporal differences features over pairs of images. However, the amount of motion observed between subsequent images or frames may not be sufficient to detect part-centric motion, particularly when the images or frames are temporally near to each other. In other words, the stabilization discussed above may not be as effective for two images that are separated by a small amount of time.

Thus, the motion feature extracting module 212 implements approaches to consider multiple images, or a sequence of images, spaced further apart to improve the detection accuracy of an articulated object. In some instances, the multiple images may be a threshold number of sampled images that span a minimum sampling time period so that motion (e.g., arm and leg motion) of an articulated object (e.g., human) is more likely to be detected.

In various embodiments, to determine motion over a plurality, or sequence of images, the motion feature extracting module 212 may compute image differences between a current image and n/m other images spaced apart temporarily by m frames from t-m to t-n, as follows:

$$D_0^\sigma(n,m) = \begin{bmatrix} I_t - I_{t-m,t} \\ I_t - I_{t-2m,t} \\ \vdots \\ I_t - I_{t-n,t} \end{bmatrix} \quad \text{Equ. (2)}$$

Using the notation of equation (2), the features $D^\sigma$ in equation (1) computed from two neighboring images may be equivalent to $D_0^\sigma(1,1)$. The motion feature extracting module 212 may define m as the image skip and n as the image span. As the motion feature extracting module 212 increases the image skip m between the pair of images, stabilization becomes more effective. In various embodiments, the motion feature extracting module 212 extracts motion features using a larger image span (e.g., n=8) and a smaller image skip (e.g., m=1 or m=4)

In various embodiments, to determine motion over a plurality, or sequence of images, the motion feature extracting module 212 may compute image differences between neighboring images within a multi-image set, as follows:

$$D_1^\sigma(n,m) = \begin{bmatrix} I_t - I_{t-m,t} \\ I_{t-m,t} - I_{t-2m,t} \\ \vdots \\ I_{t-(n-m),t} - I_{t-n,t} \end{bmatrix} \quad \text{Equ. (3)}$$

In various embodiments, to determine motion over a plurality, or sequence of images, the motion feature extracting module 212 may compute the difference between a mean image $M_t$ and neighboring images, as follows:

$$D_M^\sigma(n,m) = \begin{bmatrix} M_t - I_t \\ M_t - I_{t-m,t} \\ \vdots \\ M_t - I_{t-n,t} \end{bmatrix}, \quad \text{Equ. (4)}$$

where $$M_t = \frac{m}{n}\sum_i^{n/m} I_{t-im,t}$$

Ultimately, the motion feature extracting module 212 determines and extracts motion features from the useful motion that has been isolated in the sequence of images by the motion stabilizing module 210.

The temporal difference features defined above use a signed temporal gradient. However, in various embodiments, the motion feature extracting module 212 may encode the temporal differences using the absolute value of the temporal gradient, or rectified gradients, as well. Rectified gradients compute two features for each pixel's temporal gradient dt corresponding to a max(0, dt) and a −min(0, dt). For pedestrian detection, the sign of the temporal gradient may provide additional information because people typically having darker hair than the background in the image. Moreover, the pants of a person are often a darker color (e.g., blue jeans or dark slacks).

In some embodiments, the motion feature extracting module 212 may add spatial invariance by pooling the extracted features over a c×c sized rectangular window. In some embodiments, the motion feature extracting module 212 may normalize the features extracted for classification purposes (e.g., detection purposes using linear Support Vector Machine (SVM) classifiers and so forth).

In various embodiments, the motion feature extracting module 212 may also extract static features to be used for articulated object detection. For example, the motion feature extracting module 212 may extract a first set of static features that include color features (three channels), gradient magnitude (one channel), and gradient histogram (six channels). The ten channel static features provided above may be concatenated and denoted by $\Omega_{static}(I_t)$. The motion feature extracting module 212 may also extract a second set of static features that include Histogram of Oriented Gradients (HOG) descriptors.

The articulated object detection module 214 receives the motion features extracted by the motion feature extracting module 212, and determines that the motion likely characterizes a particular type of articulated object (e.g., a pedestrian walking). In various embodiments, the articulated object detection module 214 performs the detection using a "trained" classification algorithm (e.g., SVM). The classification algorithm may be trained to detect motion that characterizes the particular type of object using a training technique where motion known to characterize the particular type of object is labeled (e.g., human labeling), and thus, the classification algorithm learns a typical range of motion, a shape and a size of the motion, etc., for a particular type of object.

The operations of the one or more computing device(s) 202 and/or the network-accessible devices 228 that comprise the motion detection device 102 are described in additional detail with regard to FIGS. 3 and 4 below.

Illustrative Processes

Figure 3:
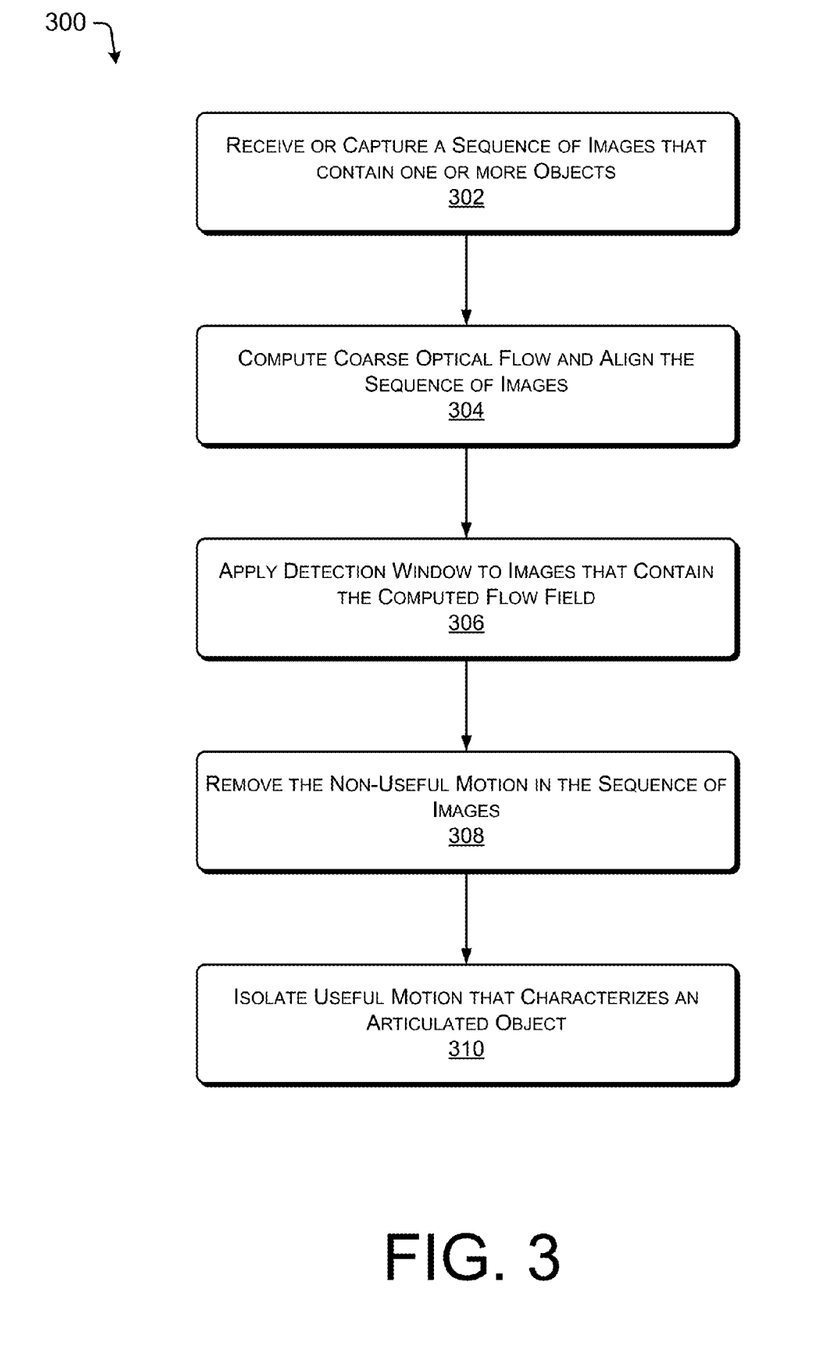
FIG. 3 shows an example process that stabilizes a sequence of images, in accordance with various embodiments described herein.
Figure 4:
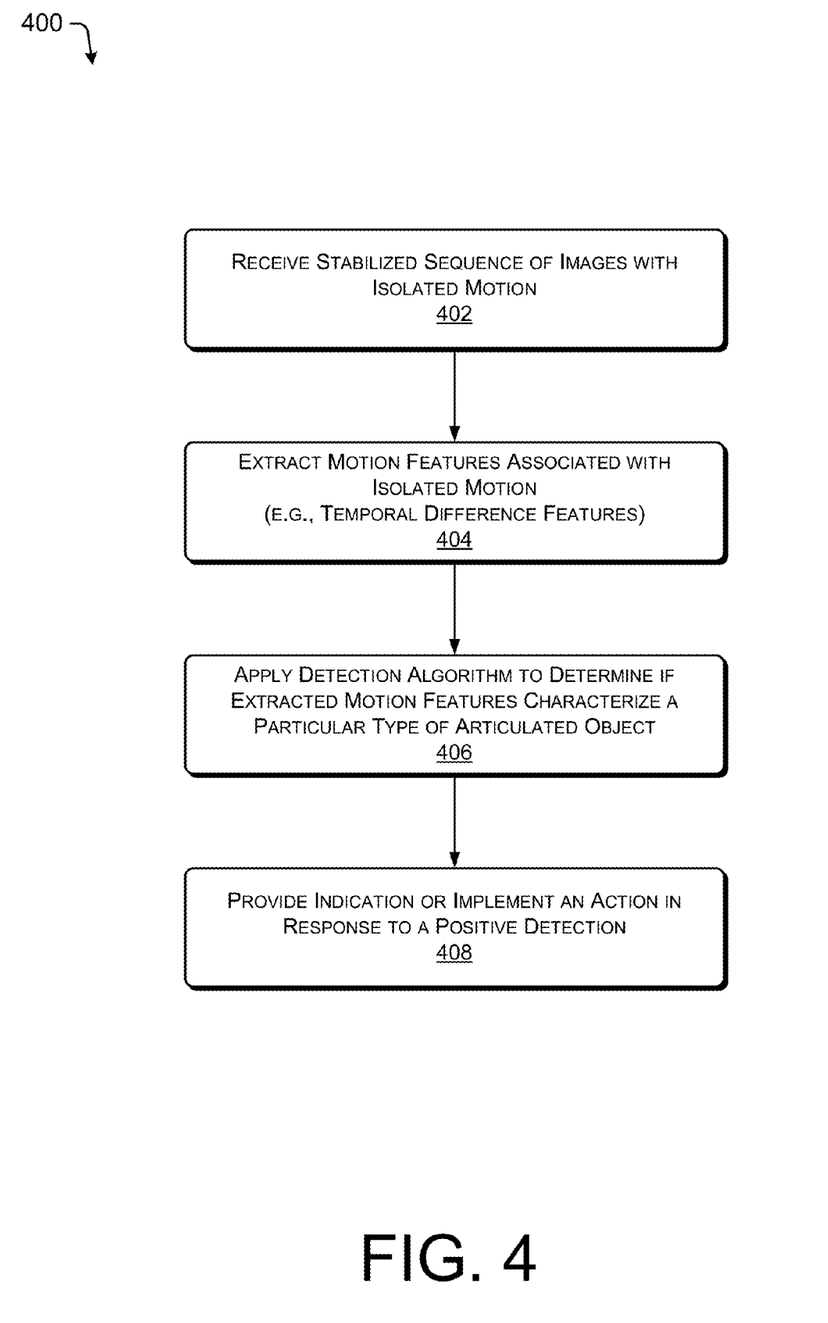
FIG. 4 shows an example process that extracts motion features from useful motion that has been isolated in a sequence of images, in accordance with various embodiments described herein.

The processes illustrated in FIGS. 3 and 4 described herein are each a collection of blocks or actions in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 3 shows an example process 300 that stabilizes a sequence of images received at the motion detection device 102 or captured by the image capture unit 220 of the motion detection device 102. The example process 300 may be implemented by the motion detection device 102 (e.g., computing device(s) 202) and/or the network-accessible devices 228, or by other devices.

At block 302, the motion stabilizing module 210 receives or captures a sequence of images (e.g., at least two images) associated with a visual scene that contains one or more objects. In various embodiments, the image capture unit 222 of the motion detection device 102 may capture and/or store the sequence of images. In alternative embodiments, the motion detection device 102 may receive and/or store the sequence of images via network 226. In at least one implementation, the sequence of images may span at least a minimum time period (e.g., one to three seconds so that the full motion range of arm swings and/or leg steps is captured) that may be sufficient to capture part-centric motion that characterizes a particular type of object, so that the object can be detected. In some implementations, the sequence of images may include at least a minimum number of images (e.g., four, ten, fifty, etc.) that may be sufficient to capture part-centric motion that characterizes a particular type of object, so that the object can be detected.

At block 304, the motion stabilizing module 210 computes coarse optical flow for the sequence of images. In various embodiments, the optical flow is computed in association with a predetermined level of coarseness associated with a particular type of object the motion detection device 102 is configured to detect. For instance, the motion stabilizing module 210 may use the Lucas-Kanade method or other optical flow algorithm that can compute optical flow for a group of neighboring pixels, as discussed above. The motion stabilizing module 210 may configure the predetermined level of coarseness by setting and/or adjusting a scale a to compute optical flow, as discussed above.

At block 306, the motion stabilizing module 210 applies a detection window (e.g., image patch) to images (e.g., warped image $I'_{t-1,t}$) in the sequence that contain the computed flow field (e.g., $W_{t,t-1}$). The size of the detection window may be based on the type of object the motion detection device 102 is configured to detect and/or a proximity in which the object is to be detected (e.g., a pedestrian within five feet of an automobile).

At block 308, the motion stabilizing module 210 removes the non-useful or irrelevant motion from the sequence of images (e.g., the general, smooth, low frequency and/or non-periodic motion that typically is associated with camera-centric motion and/or object-centric motion). For example, the motion stabilizing module 210 removes the motion that aligns in the warped image. The amount of motion removed may not satisfy a minimum threshold level of motion (e.g., from one image to the next or from a first image to a last image in the sequence).

At block 310, the motion stabilizing module 210 isolates the useful motion that likely characterizes a particular type of articulated object included in the visual scene (e.g., the non-rigid, high frequency and/or periodic motion that typically is associated with part-centric motion). For example, the motion stabilizing module 210 isolates the motion that satisfies a minimum threshold level of motion. This motion may occur in a particular region of the sequence of images as determined by the detection window. Thus, the motion detection device 102 is aware of the regions or spaces in the visual scene where the useful motion occurs.

FIG. 4 shows an example process 400 that extracts motion features from the useful motion isolated in FIG. 3, and detects a particular type of object in the visual scene. The example process 400 may be implemented by the motion detection device 102 (e.g., computing device(s) 202) and/or the network-accessible devices 228, or by other devices.

At block 402, the motion feature extraction module 212 receives the sequence of images that have been stabilized and that include the isolated motion.

At block 404, the motion feature extraction module 212 extracts motion features associated with the isolated motion (e.g., the part-centric motion). For example, the motion feature extraction module 212 may use the temporal difference features discussed above with respect to FIG. 2. In some embodiments, the motion feature extraction module 212 may also extract static image features that may be used for detection and/or classification purposes.

At block 406, the articulated object detection module 214 applies a detection or classification algorithm to the motion features extracted to determine if the motion features characterize a particular type of articulated object (e.g., typical range of motion, shape and size of parts, etc.)

At block 408, the motion detection device 102 may provide an indication or implement an action in response to positive detection or positive classification of a particular type of object. For example, the indication may be audible and/or visual indication that conveys that the articulated object (e.g., a pedestrian) has been detected, as well, as a warning to take a remedial action (e.g., stop or slow down to avoid a collision). In another example, motion detection device 102 may instruct or cause a larger system (e.g., an automobile) to implement an automatic action (e.g., automatically stop the automobile or take steering control away from the driver and change steering directions).

The techniques, devices, modules and example processes discussed above may be implemented for different type of articulated objects.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more image capture devices that capture a sequence of images;
one or more processors; and
one or more memories storing instructions that, when executed by the one or more processors, cause the system to:
compute optical flow of movement of an object within the sequence of images;
extract motion features based at least in part on the optical flow of the movement of the object within the sequence of images, wherein the motion features characterize part-centric motion that is associated with typical movement of an individual part of a particular type of object and that is useful in distinguishing the particular type of object from other types of objects; and
determine, based at least in part on the motion features, that the optical flow of the movement of the object characterizes the particular type of object within the sequence of images.

2. The system as recited in claim 1, wherein the instructions further cause the system to compute the optical flow of the movement of the object based on individual groups of pixels within the sequence of images.

3. The system as recited in claim 2, wherein the optical flow of the movement of the object based on the individual groups of pixels is represented as at least one coarse optical flow field.

4. The system as recited in claim 3, wherein the instructions further cause the system to determine, based at least in part on the at least one coarse optical flow field, that one or more regions within the sequence of images contain at least a threshold amount of motion, wherein the motion features are extracted from the one or more regions within the sequence of images that contain at least the threshold amount of motion and not from one or more other regions within the sequence of images that do not contain at least the threshold amount of motion.

5. The system as recited in claim 4, wherein the instructions further cause the system to apply one or more detection windows to the one or more regions within the sequence of images that contain at least the threshold amount of motion, wherein a respective size of an individual detection window is based at least in part on a distance between the one or more image capture devices and the object.

6. The system as recited in claim 1, wherein the instructions further cause the system to determine that the sequence of images is captured during a period of time that meets or exceeds a predetermined minimum period of time in which it typically takes the individual part of the particular type of object to complete at least one periodic movement, and wherein the optical flow of the movement of the object is computed based at least in part on the determination that the sequence of images is captured during the period of time that meets or exceeds the predetermined minimum period of time.

7. The system as recited in claim 1, wherein the instructions further cause the system to determine that a number of images in the sequence of images meets or exceeds a predetermined minimum number of images, and wherein the optical flow of the movement of the object is computed based at least in part on the determination that the number of images in the sequence of images meets or exceeds the predetermined minimum number of images.

8. The system as recited in claim 1, wherein the instructions further cause the system to output a warning in response to determining that the optical flow of the movement of the object characterizes the particular type of object within the sequence of images.

9. The system as recited in claim 1, wherein the instructions further cause the system to use one or more trained classification algorithms to determine that the optical flow of the movement of the object characterizes the particular type of object within the sequence of images.

10. The system as recited in claim 1, wherein the instructions further cause the system to determine that the optical flow of the movement of the object characterizes a specific pose of the particular type of object.

11. A device comprising:
one or more processors;
one or more computer-readable storage media storing computer-executable instructions that, when executed by the one or more processors, cause the device to:
receive a sequence of images from one or more image capture devices;
determine one or more regions within the sequence of images that include part-centric motion of an object by computing optical flow of movement of the object;
identify a typical movement of the object within the one or more regions within the sequence of images based on the part-centric motion of the object; and
associate the typical movement of the object with a particular object type.

12. The device as recited in claim 11, wherein the computer-executable instructions further case the device to determine one or more other regions within the sequence of images that include motion other than the part-centric motion.

13. The device as recited in claim 12, wherein the motion other than the part-centric motion comprises at least one of camera-centric motion or object-centric motion.

14. The device as recited in claim 11, wherein the computer-executable instructions further case the device to use one or more trained classification algorithms to associate the typical movement of the object with the particular object type.

15. The device as recited in claim 14, wherein the object comprises a human and the part-centric motion is associated with at least one of an arm or a leg.

16. A method comprising:
receiving a sequence of images from one or more image capture devices;
computing, by one or more computing devices, optical flow of movement of an object within the sequence of images;
extract motion features based at least in part on the optical flow of the movement of the object within the sequence of images, wherein the motion features characterize part-centric motion that is associated with typical movement of an individual part of a particular type of object and that is useful in distinguishing the particular type of object from other types of objects; and
determining, based at least in part on the motion features, that the optical flow of the movement of the object characterizes the particular type of object within the sequence of images.

17. The method as recited in claim 16, further comprising computing the optical flow of the movement of the object based on individual groups of pixels within the sequence of images.

18. The method as recited in claim 17, wherein the optical flow of the movement of the object based on the individual groups of pixels is represented as at least one coarse optical flow field, the method further comprising:
determining, based at least in part on the at least one coarse optical flow field, that one or more regions within the sequence of images contain at least a threshold amount of motion; and
determining, based at least in part on the at least one coarse optical flow field, one or more other regions within the sequence of images that do not contain at least the threshold amount of motion, wherein the motion features are extracted from the one or more regions within the sequence of images that contain at least the threshold amount of motion and not from the one or more other regions within the sequence of images that do not contain at least the threshold amount of motion.

19. The method as recited in claim 18, further comprising applying one or more detection windows to the one or more regions within the sequence of images that contain at least the threshold amount of motion, wherein a respective size of an individual detection window is based at least in part on a distance between the one or more image capture devices and the particular type of object.

20. The method as recited in claim 16, further comprising outputting a detection warning in response to determining that the optical flow of the movement of the object characterizes the particular type of object.

* * * * *